(12) United States Patent
Cho et al.

(10) Patent No.: US 10,168,807 B2
(45) Date of Patent: Jan. 1, 2019

(54) TOUCH PANEL, METHOD FOR MANUFACTURING TOUCH PANEL, DISPLAY DEVICE, AND METHOD FOR MANUFACTURING DISPLAY DEVICE

(71) Applicant: Samsung Display Co., Ltd., Yongin-si (KR)

(72) Inventors: Sun Haeng Cho, Hwaseong-si (KR); Kyung Seop Kim, Hwaseong-si (KR); Cheol Kyu Kim, Seoul (KR); Ki-Hyun Cho, Suwon-si (KR); Sang Youn Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/924,320

(22) Filed: Oct. 27, 2015

(65) Prior Publication Data

US 2016/0306474 A1   Oct. 20, 2016

(30) Foreign Application Priority Data

Apr. 14, 2015   (KR) .................. 10-2015-0052482

(51) Int. Cl.
*G06F 3/041* (2006.01)
*G06F 3/047* (2006.01)
*G06F 1/16* (2006.01)
*G06F 3/044* (2006.01)

(52) U.S. Cl.
CPC .......... *G06F 3/0412* (2013.01); *G06F 1/1652* (2013.01); *G06F 3/044* (2013.01); *G06F 3/047* (2013.01); *G06F 3/0416* (2013.01); G06F 2203/04102 (2013.01); G06F 2203/04103 (2013.01)

(58) Field of Classification Search
CPC ......... G06F 1/1652; G06F 2203/04102; G06F 2203/04103; G06F 3/0412; G06F 3/0416; G06F 3/044; G06F 3/047
See application file for complete search history.

(56) References Cited

U.S. PATENT DOCUMENTS

| | | | |
|---|---|---|---|
| 9,141,238 B2 | 9/2015 | Kang et al. | |
| 2010/0302193 A1* | 12/2010 | Park | G06F 1/1647 345/173 |
| 2012/0094090 A1* | 4/2012 | Yamazaki | G06F 3/041 428/195.1 |
| 2014/0002331 A1* | 1/2014 | Yoo | G09G 3/3208 345/76 |
| 2014/0063364 A1 | 3/2014 | Hirakata | |
| 2014/0232972 A1* | 8/2014 | Kim | G02F 1/13338 349/113 |
| 2015/0090574 A1* | 4/2015 | Lin | G06F 1/1692 200/5 R |

FOREIGN PATENT DOCUMENTS

| | | |
|---|---|---|
| KR | 10-2011-0044536 | 4/2011 |
| KR | 10-1401406 | 5/2014 |
| KR | 10-2014-0070107 | 6/2014 |

* cited by examiner

*Primary Examiner* — Insa Sadio
(74) *Attorney, Agent, or Firm* — H.C. Park & Associates, PLC

(57) ABSTRACT

An exemplary embodiment discloses a touch panel including: a substrate; an organic layer disposed on the substrate; and a touch sensor unit disposed on a surface of the organic layer.

4 Claims, 14 Drawing Sheets

1000

TOUCH PANEL, METHOD FOR MANUFACTURING TOUCH PANEL, DISPLAY DEVICE, AND METHOD FOR MANUFACTURING DISPLAY DEVICE

CROSS-REFERENCE TO RELATED APPLICATION

This application claims priority from and the benefit of Korean Patent Application No. 10-2015-0052482, filed on Apr. 14, 2015, which is hereby incorporated by reference for all purposes as if fully set forth herein.

BACKGROUND

Field

Exemplary embodiments relate to a touch panel, a method for manufacturing a touch panel, a display device, and a method for manufacturing a display device.

Discussion of the Background

A touch panel is an apparatus which detects a touch by a pen or a user's finger. The touch panel has been included on display panels such as an organic light emitting diode display or a liquid crystal display to receive input signal to a display device.

The touch panel includes a substrate and a touch sensor disposed on the substrate to detect a touch. Recently, a flexible touch panel including a flexible substrate has been developed.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel with improved flexibility, a method for manufacturing a touch panel, a display device, and a method for manufacturing a display device.

Additional aspects will be set forth in the detailed description which follows, and, in part, will be apparent from the disclosure, or may be learned by practice of the inventive concept.

An exemplary embodiment discloses a touch panel including: a substrate; an organic layer disposed on the substrate; and a touch sensor unit disposed on a surface of the organic layer.

An exemplary embodiment also discloses a method for manufacturing a touch panel including: disposing a sacrificial layer on a support substrate; disposing an organic layer on the sacrificial layer; disposing a touch sensor unit on the organic layer; separating the organic layer with the touch sensor unit from the sacrificial layer; and bonding the organic layer with the touch sensor unit onto a substrate.

An exemplary embodiment further discloses a display device including: a display panel displaying an image; an organic layer positioned on the display panel; and a touch sensor unit formed on a surface of the organic layer.

An exemplary embodiment also discloses a method for manufacturing a display device including: disposing a sacrificial layer on a support substrate; disposing an organic layer on the sacrificial layer; disposing a touch sensor unit on the organic layer; separating the organic layer with the touch sensor unit from the sacrificial layer; and bonding the organic layer with the touch sensor unit onto a display panel configured to display an image.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
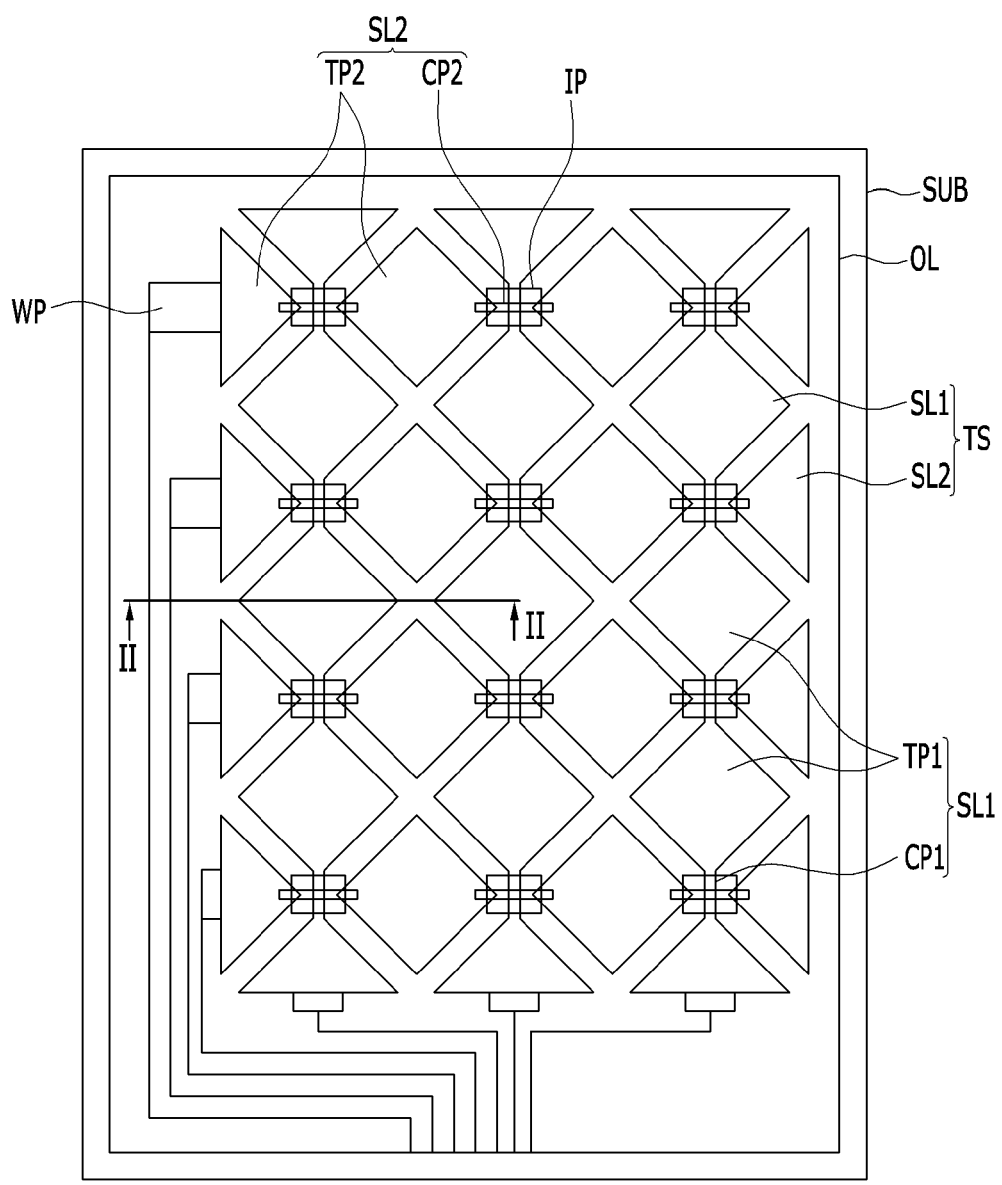
FIG. 1 is a plan view illustrating a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch panel according to an exemplary embodiment will be described with reference to FIG. 1 and FIG. 2.

FIG. 1 is a plan view illustrating a touch panel according to an exemplary embodiment. FIG. 2 is a cross-sectional view taken along the section line II-II of FIG. 1.

Figure 2:
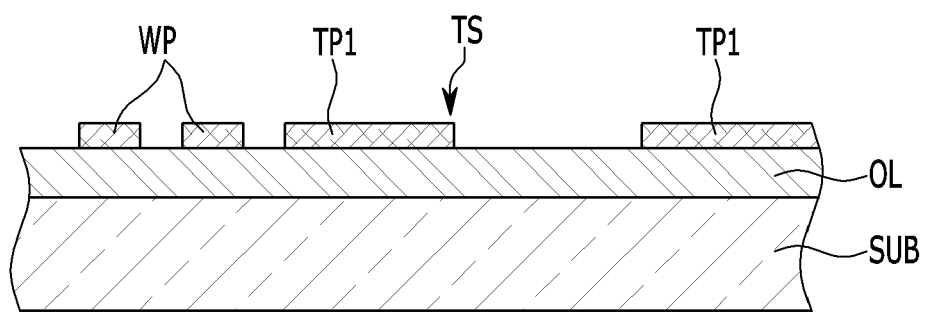
FIG. 2 is a cross-sectional view taken along the section line II-II of FIG. 1.

Referring to FIG. 1 and FIG. 2, a touch panel 1000 configured to detect a touch according to an exemplary embodiment includes a substrate SUB, an organic layer OL, a wiring part WP, and a touch sensor unit TS. The touch panel 1000 may include a touch controller (not illustrated) formed in a form of a flexible printed circuit board (PCB), a printed circuit board (PCB), or the like, the touch controller may be connected to the wiring part WP. The touch controller may digitize an electrical analog signal transmitted from the touch panel 1000 into a digital signal using a converter, and calculate information on the touched location.

The substrate SUB may be flexible and may include an organic material, an inorganic material, glass, or metals like stainless steel. The substrate SUB may be flexible, but the exemplary embodiments are not limited thereto, and therefore, the substrate SUB may be stretchable, foldable, bendable, or rollable. The substrate SUB is flexible, stretchable, foldable, bendable, or rollable, and therefore, the entire touch panel 1000 may be flexible, stretchable, foldable, bendable, or rollable.

The substrate SUB may include at least one of a polarizer and a retardation film. Here, the polarizer may be a linear polarizer and the retardation film may be a $\lambda/4$ retardation film, but the exemplary embodiments are not limited thereto, and therefore, the substrate SUB may include at least one of various polarizers and retardation films.

The substrate SUB may form at least a portion of a window of a car or at least a portion of a window of a building.

The organic layer OL is disposed on the substrate SUB and is directly bonded onto the substrate SUB. However, the exemplary embodiments are not limited thereto, and an adhesive layer may be disposed between the organic layer OL and the substrate SUB. The organic layer OL may include acrylic organic materials but the exemplary embodiments are not limited thereto, and therefore, the organic layer OL may include various organic materials. The organic layer OL may have a thickness thinner than that of the substrate SUB. For example, the organic layer OL may have a thickness of 1 μm to 20 μm. The organic layer OL may be directly bonded onto the substrate SUB by heat. The organic layer OL may have a plane area smaller than that of the substrate SUB, but the exemplary embodiments are not limited thereto, and therefore, the organic layer OL may have the same plane area as the substrate SUB, or a plane area larger than that of the substrate SUB.

The wiring part WP is disposed on the substrate SUB in an outside region of the organic layer OL, and is connected to the touch sensor unit TS. The wiring part WP may connect between the touch sensor unit TS and the touch controller, and may include opaque conductive materials such as metal or transparent conductive materials. The wiring part WP may be formed on the organic layer OL using a different process from or the same process as the touch sensor unit TS.

The touch sensor unit TS is configured to directly detect a touch and is generally formed transparent. The touch sensor unit TS is formed on the organic layer OL and thus may be formed in a capacitive type.

The touch sensor unit TS includes a first signal line SL1 which extends in a first direction on the organic layer OL, the first signal line SL1 being connected to the wiring part WP, and a second signal line SL2 which extends in a second direction intersecting the first direction, the second signal line SL2 being connected to the wiring part WP.

The first signal line SL1 includes at least two first signal lines SL1, and each of the first signal line SL1 may sequentially be disposed in the second direction.

The first signal line SL1 includes a first touch pad part TP1 and a first connection part CP1.

The first touch pad part TP1 includes at least two of first touch pad parts TP1, and each of the first touch pad parts TP1 are disposed in the first direction spaced apart from each other. The first touch pad part TP1 may include at least one of transparent conductive oxides such as silver nano wire (AgNW), metal mesh, and indium tin oxide (ITO), transparent conductive materials such as carbon nanotube (CNT) and graphene, conductive polymers such as PEDOT:PSS, and the like.

The first connection part CP1 connects between respective first touch pad parts TP1. Specifically, the first connection part CP1 connects the first touch pad parts TP1 that are disposed adjacently. According to the exemplary embodiment, the first touch pad part TP1 and the first connection part CP1 are integrally formed, but the exemplary embodiments are not limited thereto, and therefore, the first touch pad part TP1 and the first connection part CP1 may be made of different materials. The first connection part CP1 is insulated from a second connection part CP2 at where the first connection part CP1 crosses the second connection part CP2. More specifically, an insulating pattern IP is disposed between the first connection part CP1 and the second connection part CP2.

The second signal line SL2 includes at least two of second signal lines SL2, and each of the second signal line SL2 may sequentially be disposed in the first direction.

The second touch pad part TP2 includes at least two of second touch pad parts TP2, and each of the second touch pad parts TP2 are disposed in the second direction spaced apart from each other. The second touch pad part TP2 may include at least one of the transparent conductive oxides such as silver nano wire (AgNW), metal mesh, and indium tin oxide (ITO), the transparent conductive materials such as carbon nanotube (CNT) and graphene, the conductive polymers such as PEDOT:PSS, and the like.

The second connection part CP2 connects between respective second touch pad parts TP2. Specifically, the second connection part CP2 connects the second touch pad parts TP2 that are adjacently disposed. According to the exemplary embodiment, the second touch pad part TP2 and the second connection part CP2 may be made of different materials, but the exemplary embodiments are not limited thereto, and therefore, the second touch pad part TP2 and the second connection part CP2 may be integrally formed. The second connection part CP2 is insulated from the first connection part CP1.

The first signal line SL1 and the second signal line SL2 are insulated from each other at where the first signal line SL1 and the second signal line SL2 are disposed crossing each other. An insulating pattern IP is disposed between the first connection part CP1 and the second connection part CP2. The insulating pattern IP may include at least one of silicon oxide ($SiO_x$) and silicon nitride ($SiN_x$), but the exemplary embodiments are not limited thereto, and therefore, may be formed in a form of an insulating layer.

The first signal line SL1 and the second signal line SL2 may be disposed on the same layer or different layers disposed on the organic layer OL.

In the touch panel 1000 according to the exemplary embodiments, when a voltage is sequentially applied to the first signal line SL1 and the second signal line SL2, capacitance is formed between the first signal lines SL1 and the second signal lines SL2, respectively. Accordingly, when a touch is performed on the touch sensor unit TS, a capacitance formed at a touched position is changed, and the voltage applied to the first signal line SL1 or the second signal line SL2 is changed, so that the touch sensor unit TS of the touch panel 1000 may detect the touched position.

In the touch panel 1000 according to the exemplary embodiment, the organic layer OL including an organic material is bonded to the flexible substrate SUB and the touch sensor unit TS is disposed on the organic layer OL, thereby improving the entire flexibility. That is, the touch panel 1000 may have improved flexibility.

Hereinafter, a method for manufacturing a touch panel according to an exemplary embodiment will be described with reference to FIGS. 3, 4, 5, 6, and 7. The touch panel according to the exemplary embodiments as described above may be manufactured by using the manufacturing method according to the exemplary embodiment, but the exemplary embodiments are not limited thereto, and therefore, the touch panel according to the exemplary embodiment as described above may be manufactured using various manufacturing methods.

Figure 3:
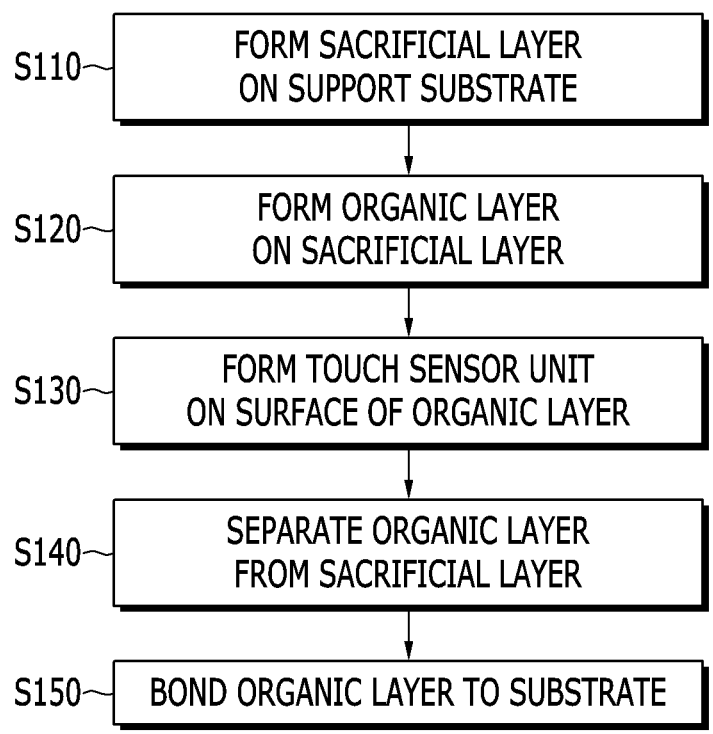
FIG. 3 is a flow chart illustrating a method for manufacturing a touch panel according to an exemplary embodiment.

FIG. 3 is a flow chart illustrating a method for manufacturing a touch panel according to an exemplary embodiment. FIGS. 4, 5, 6, and 7 are cross-sectional views illustrating a method for manufacturing a touch panel according to an exemplary embodiment.

Figure 4:
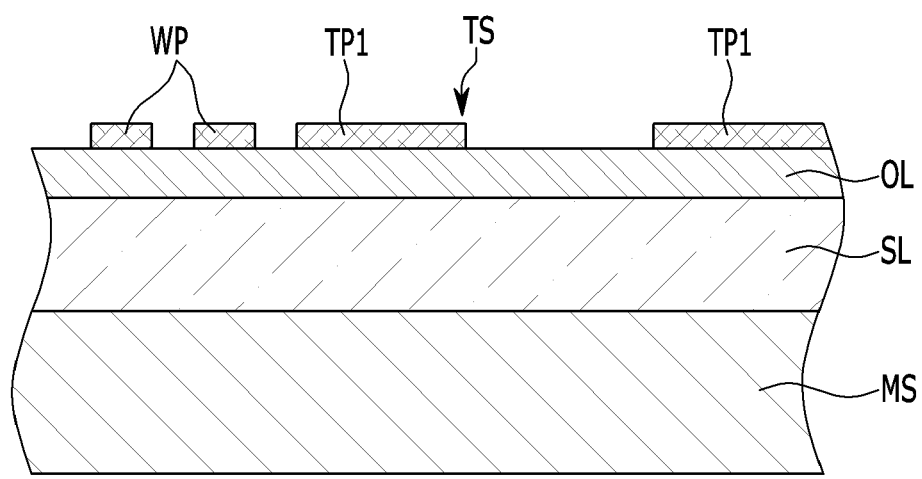
FIGS. 4, 5, 6, and 7 are cross-sectional views illustrating a method for manufacturing a touch panel according to an exemplary embodiment.

First, referring to FIG. 3 and FIG. 4, a sacrificial layer SL is disposed on a support substrate MS (S110). In detail, the sacrificial layer SL is formed on the support substrate MS, the support substrate MS including at least one of glass, an inorganic material, an organic materials, and the like. Here, the sacrificial layer SL may include an adhesive such as a pressure sensitive adhesive (PSA), but the exemplary embodiments are not limited thereto, and therefore, the sacrificial layer may include materials which are sublimatable by heat from laser beam and the like, or materials which are soluble by a solvent. For example, the sacrificial layer SL comprises at least one of acryl polymer and siloxane polymer.

Next, the organic layer OL is disposed on the sacrificial layer SL (S120). In detail, the thin film organic layer OL may be formed by applying, depositing, or attaching the organic material onto the sacrificial layer SL. The organic layer OL is formed on the sacrificial layer SL accordingly may have a thickness of 1 μm to 20 μm.

Next, the touch sensor unit TS is formed on the organic layer OL (S130). In detail, a transparent conductive layer made of at least one of the transparent conductive oxides such as silver nano wire (AgNW), metal mesh, and indium tin oxide (ITO), the transparent conductive materials such as carbon nanotube (CNT) and graphene, the conductive polymers such as PEDOT:PSS, and the like is formed on the organic layer OL, and the transparent conductive layer is patterned using an MEMS technology, such as a photolithography process, to form the touch sensor unit TS on the organic layer OL. In this case, the wiring part WP may be formed with the touch sensor unit TS.

Figure 5:
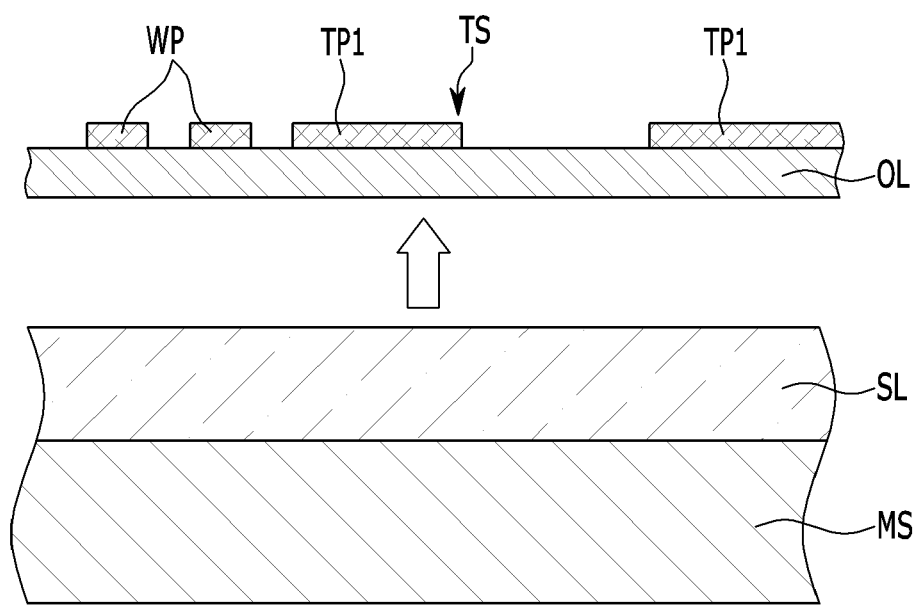

Next, referring to FIG. 5, the organic layer OL including the touch sensor unit TS is separated from the sacrificial layer SL (S140). In detail, the sacrificial layer SL including the adhesive is cooled to a temperature of 10° C. or less to deteriorate the adhesion of the sacrificial layer SL, thereby separating the organic layer OL including the touch sensor unit TS from the sacrificial layer SL. As a result, the organic layer OL including the touch sensor unit TS is separated from the support substrate MS.

When the sacrificial layer SL includes the materials which are sublimatable by heat from laser beam, the laser beam may be radiated to the sacrificial layer SL through the support substrate MS to sublimate the sacrificial layer SL, thereby separating the organic layer OL from the sacrificial layer SL. Further, when the sacrificial layer SL includes the materials soluble by a solvent, the sacrificial layer SL may be dissolved by the solvent to separate the organic layer OL from the sacrificial layer SL.

Accordingly, the method for manufacturing a touch panel according to an exemplary embodiment uses the sacrificial layer SL to separate the organic layer OL including the touch sensor unit TS from the support substrate MS, such that the touch sensor unit TS formed on the organic layer OL may suffer decreased damaged from static electricity (ESD).

Figure 6:
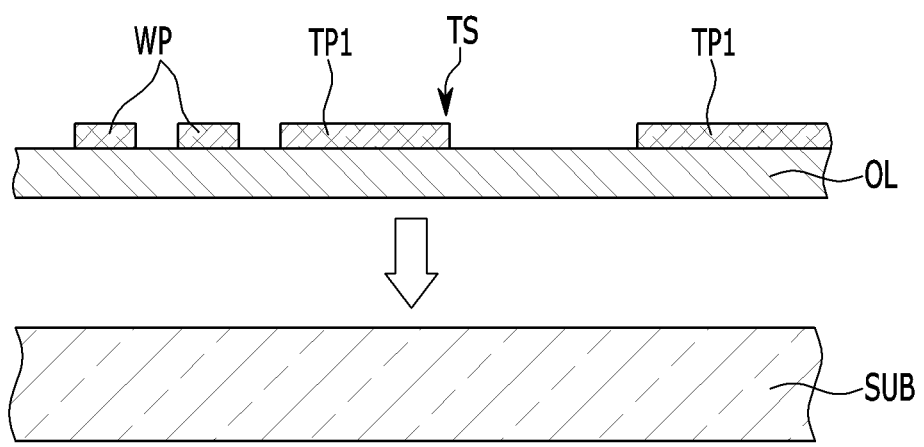
Figure 7:
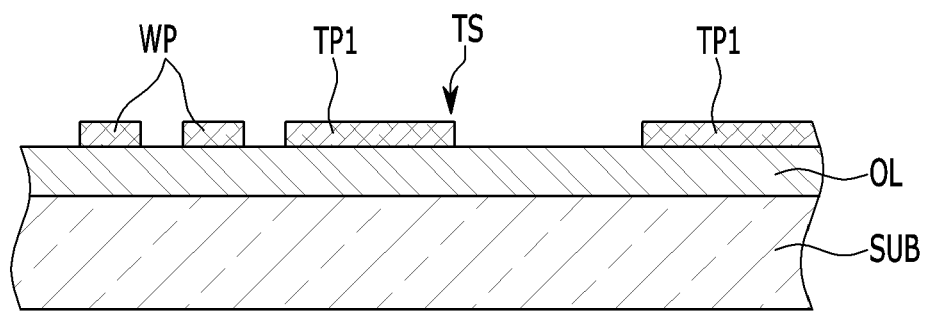

Next, referring to FIG. 6 and FIG. 7, the organic layer OL including the touch sensor unit TS is bonded to the substrate SUB (S150). In detail, the organic layer OL including the touch sensor unit TS is disposed on the substrate SUB and an interface between the organic layer OL and the substrate SUB is heated using laser beam and the like to directly bond the organic layer OL to the substrate SUB. As a result, the touch panel including the substrate (SUB), the organic layer OL, and the touch sensor unit TS is formed. Here, the substrate SUB may include at least one of an organic material, an inorganic material, glass, and metals like stainless steel, and may also include at least one of a polarizer and a retardation film. The touch panel may be at least a portion of a window of a car or a building.

As such, the method for manufacturing a touch panel according to an exemplary embodiment includes: forming the organic layer OL, including the touch sensor unit TS disposed thereon, on the support substrate MS; separating the organic layer OL from the support substrate MS; and directly bond the organic layer OL onto the substrate SUB. Therefore, an effect to the substrate SUB due to the process of respectively forming the organic layer OL and the touch sensor unit TS may be reduced. That is, since the organic layer OL and the touch sensor unit TS may be formed regardless of unique material characteristics of the substrate SUB and the position of the substrate SUB, the material characteristics of the substrate SUB and the position of the substrate SUB need not be considered in the process of manufacturing the touch panel 1000. For example, since there is no need to consider the material characteristics of the substrate SUB and the position of the substrate SUB, the organic layer OL formed with the touch sensor unit TS may be directly bonded to the substrate SUB including an organic material, an inorganic material, glass, or metals like stainless steel, an optical substrate SUB including at least one of the polarizer and the retardation film, a substrate SUB which forms the window of the car or the building, a very flexible substrate SUB, and so on. That is, the exemplary embodiments provide a method for manufacturing a touch panel with improved manufacturing convenience and diversity.

As described above, the method for manufacturing a touch panel according to an exemplary embodiment uses the sacrificial layer SL to separate the organic layer OL including the touch sensor unit TS from the support substrate MS, such that the touch sensor unit TS formed on the organic layer OL may suffer decreased damage from static electricity (ESD). That is, the exemplary embodiment provides the method for manufacturing a touch panel with improved manufacturing reliability.

Further, the method for manufacturing a touch panel according to an exemplary embodiment forms the organic layer OL having the touch sensor unit TS formed on the surface thereof on the support substrate MS and separates the organic layer OL from the support substrate MS to directly bond the organic layer OL to the substrate SUB, such that the substrate SUB is not affected by the process of forming the organic layer OL and the touch sensor unit TS, respectively. That is, since the organic layer OL and the touch sensor unit TS are formed regardless of unique material characteristics of the substrate SUB and the position of the substrate SUB, there is no need to consider the material characteristics of the substrate SUB and the position of the substrate SUB in the process of manufacturing the touch panel 1000. For example, since there is no need to consider the material characteristics of the substrate SUB and the position of the substrate SUB, the organic layer OL formed with the touch sensor unit TS may be directly bonded to the substrate SUB including an organic material, an inorganic material, glass, or metals like stainless steel, an optical substrate SUB including at least one of the polarizer and the retarder, a substrate SUB which is the window of the car or the window of the building, a very flexible substrate SUB, and so on. That is, the method for manufacturing a touch panel with improved manufacturing easiness and diversity is provided.

Hereinafter, a display device according to an exemplary embodiment will be described with reference to FIG. 8 and FIG. 9. Although the exemplary embodiment illustrates an organic light emitting diode display including an organic light emitting diode an example of a display device, the exemplary embodiments are not limited thereto, and the display device may be various display devices such as liquid crystal displays (LCDs), plasma displays (PDs), field emission displays (FEDs), electrophoretic displays (EPDs), electrowetting displays (EWDs), and the like, as long as it includes a display unit displaying an image and a touch sensor unit recognizing a touch.

Figure 8:
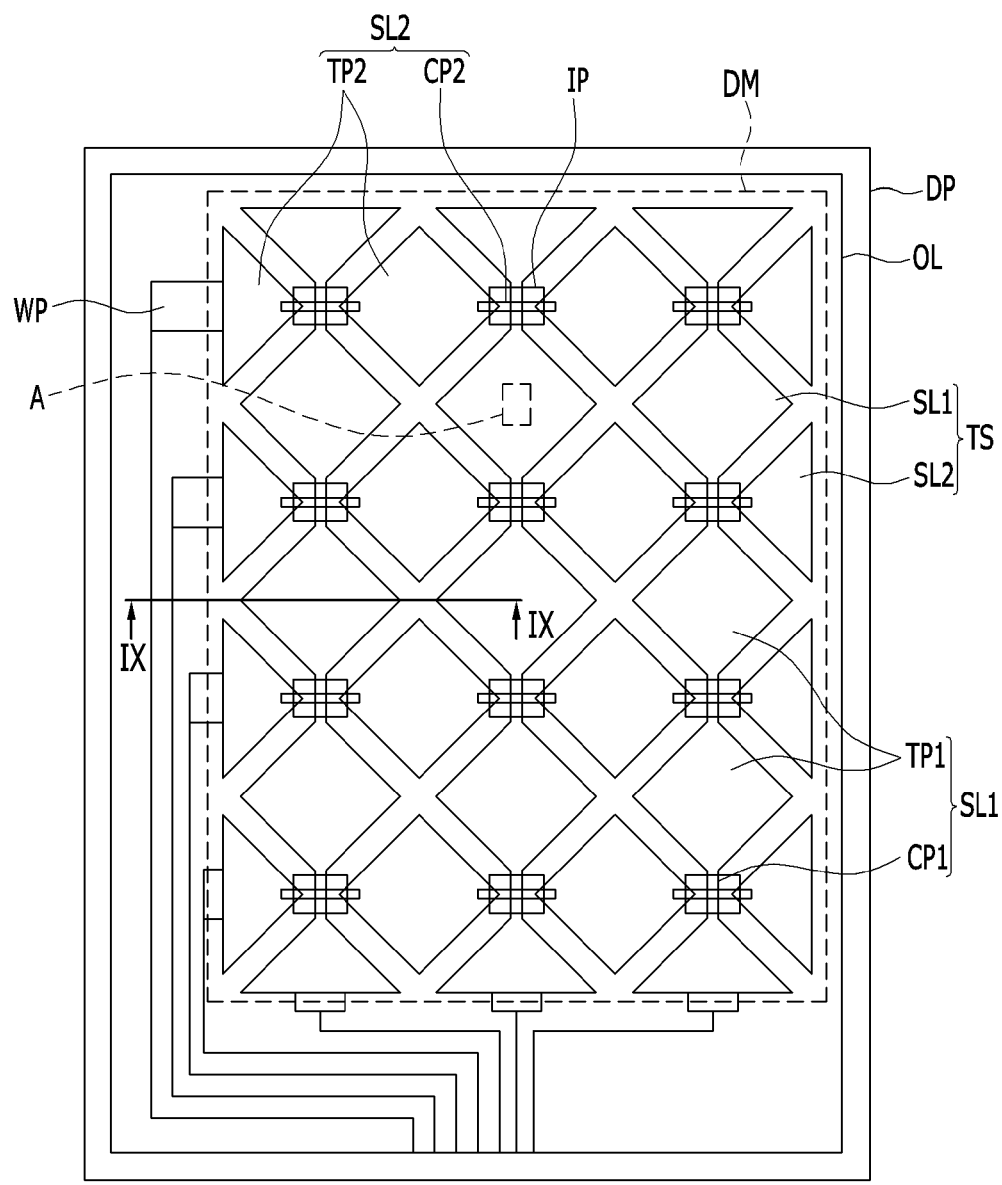
FIG. 8 is a plan view illustrating a display device according to an exemplary embodiment.

FIG. 8 is a plan view illustrating a display device according to an exemplary embodiment. FIG. 9 is a cross-sectional view taken along the section line IX-IX of FIG. 8.

Figure 9:
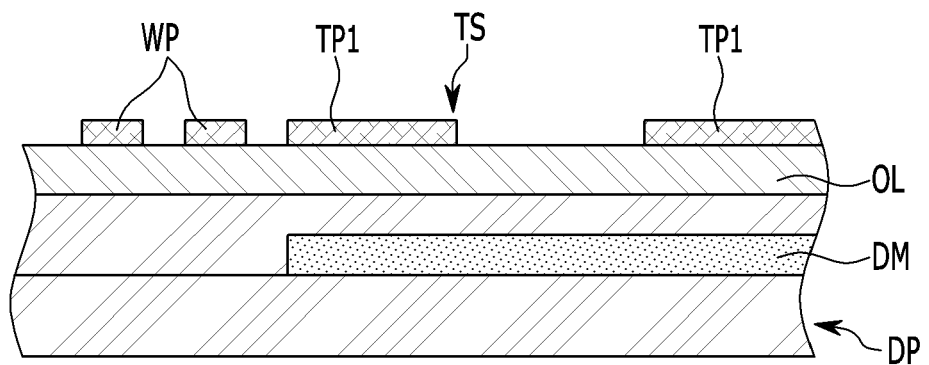
FIG. 9 is a cross-sectional view taken along the section line IX-IX of FIG. 8.

Referring to FIG. 8 and FIG. 9, a display device 2000 according to an exemplary embodiment is configured to detect a touch while simultaneously displaying an image, and includes a display panel DP, the organic layer OL, the wiring part WP, and the touch sensor unit TS. The display device 2000 may include a touch controller (not illustrated). The touch controller may be connected to the wiring part WP and be formed in a form of a flexible printed circuit display panel, a printed circuit display panel, or the like. The touch controller may digitize an electrical analog signal transmitted from the display device 2000 into a digital signal using a converter, and calculate information on the touched location.

The display panel DP may be flexible and may display an image using a plurality of pixels. Here, the pixel may mean a minimum unit displaying the image.

The display panel DP includes a display unit DM which displays an image. The display unit DM includes an organic light emitting diode (OLED) which displays an image. The display panel DP may be flexible but is not limited thereto, and therefore stretchable, foldable, bendable, or rollable. The display panel DP is flexible, stretchable, foldable, bendable, or rollable, and therefore, the entire display device 2000 may be flexible, stretchable, foldable, bendable, or rollable.

Although the exemplary embodiment provides that the display unit DM of the display panel DP includes the organic light emitting diode (OLED), but the exemplary embodiments are not limited thereto, and therefore, the display panel DP according to the exemplary embodiment may include at least one of a liquid crystal, plasma, ink, and so on. Therefore, the display unit DM of the display panel DP may be configured in various forms as long as it may display an image.

The organic layer OL is disposed on the display panel DP and is directly bonded onto the display panel DP. However, the exemplary embodiments are not limited thereto, and an adhesive layer may be disposed between the organic layer OL and the display panel DP. The organic layer OL may include acrylic organic materials, but the exemplary embodiments are not limited thereto, and therefore, the organic layer OL may include various organic materials. The organic layer OL may have a thickness thinner than that of the display panel DP. For example, the organic layer OL may have a thickness of 1 μm to 20 μm. The organic layer OL may be directly bonded onto the display panel DP by heat. The organic layer OL may have a plane area smaller than that of the display panel DP but the exemplary embodiments are not limited thereto, and therefore, the organic layer OL may have the same plane area as the display panel DP or a plane area larger than that of the display panel DP.

The wiring part WP is disposed on the substrate SUB in an outside region of the organic layer OL, and is connected to the touch sensor unit TS. The wiring part WP may connect between the touch sensor unit TS and the touch controller and may include opaque conductive materials such as metal or transparent conductive materials. The wiring part WP may be formed on the organic layer OL using a different process from or the same process as the touch sensor unit TS.

The touch sensor unit TS is configured to directly detect a touch and is generally formed transparent. The touch sensor unit TS is formed on the organic layer OL and thus may be formed in a capacitive type.

The touch sensor unit TS includes the first signal line SL1 which extends in the first direction on the organic layer OL, the first signal line SL1 being connected to the wiring part WP, and the second signal line SL2 which extends in the second direction intersecting the first direction, the second signal line SL2 being connected to the wiring part WP.

The first signal line SL1 includes at least two first signal lines SL1, and each of the first signal line SL1 may sequentially be disposed in the second direction.

The first signal line SL1 includes the first touch pad part TP1 and the first connection part CP1.

The first touch pad part TP1 includes at least two of first touch pad parts TP1, and each of the first touch pad parts TP1 are disposed in the first direction spaced apart from each other. The first touch pad part TP1 may include at least one of the transparent conductive oxides such as silver nano wire (AgNW), metal mesh, and indium tin oxide (ITO), the transparent conductive materials such as carbon nanotube (CNT) and graphene, the conductive polymers such as PEDOT:PSS, and the like.

The first connection part CP1 connects between respective the first touch pad parts TP1. Specifically, the first connection part CP1 connects the first touch pad parts TP1 that are disposed adjacently. According to the exemplary embodiment, the first touch pad part TP1 and the first connection part CP1 are integrally formed, but the exemplary embodiments are not limited thereto, and therefore, the first touch pad part TP1 and the first connection part CP1 may be made of different materials. The first connection part CP1 is insulated from a second connection part CP2 at where the first connection part CP1 crosses the second connection part CP2. More specifically, the insulating pattern IP is disposed between the first connection part CP1 and the second connection part CP2.

The second signal line SL2 includes at least two of second signal lines SL2, and each of the second signal line SL2 may sequentially be disposed in the first direction.

The second touch pad part TP2 includes at least two of second touch pad parts TP2, and each of the second touch pad parts TP2 are disposed in the second direction spaced apart from each other. The second touch pad part TP2 may include at least one of the transparent conductive oxides such as silver nano wire (AgNW), metal mesh, and indium tin oxide (ITO), the transparent conductive materials such as carbon nanotube (CNT) and graphene, the conductive polymers such as PEDOT:PSS, and the like.

The second connection part CP2 connects between respective second touch pad parts TP2. Specifically, the second connection part CP2 connects the second touch pad parts TP2 that are adjacently disposed. According to the exemplary embodiment, the second touch pad part TP2 and the second connection part CP2 may be made of different materials, but the exemplary embodiments are not limited thereto, and therefore, the second touch pad part TP2 and the second connection part CP2 may be integrally formed. The second connection part CP2 is insulated from the first connection part CP1.

The first signal line SL1 and the second signal line SL2 are insulated from each other at where the first signal line SL1 and the second signal line SL2 are disposed crossing each other. The insulating pattern IP is disposed between the first connection part CP1 and the second connection part CP2. The insulating pattern IP may include at least one of silicon oxide ($SiO_x$) and silicon nitride ($SiN_x$), but the exemplary embodiments are not limited thereto, and therefore, may be formed in the form of the insulating layer.

The first signal line SL1 and the second signal line SL2 may be disposed on the same layer or different layers disposed on the organic layer OL.

In the display device 2000 according to the exemplary embodiments, when a voltage is sequentially applied to the first signal line SL1 and the second signal line SL2, capacitance is formed between the first signal lines SL1 and the second signal lines SL2, respectively. Accordingly, when a touch is performed on the touch sensor unit TS, a capacitance formed at a touched position is changed, and the voltage applied to the first signal line SL1 or the second signal line SL2 is changed, so that the touch sensor unit TS of the display device 2000 may detect the touched position.

In the display device 2000 according to another exemplary embodiment, the organic layer OL including an organic material, is bonded to the flexible display panel DP and the touch sensor unit TS is disposed on the organic layer OL, thereby improving the entire flexibility. That is, the display device 2000 may have improved flexibility.

Hereinafter, a method for manufacturing a display device according to an exemplary embodiment will be described with reference to FIGS. 10, 11, 12, 13, and 14. The display device according to the exemplary embodiments as described above may be manufactured by using the manufacturing method according to the exemplary embodiment, but the exemplary embodiments are not limited thereto, and therefore the display device according to the exemplary embodiment as described above may be manufactured using various manufacturing methods.

Figure 10:
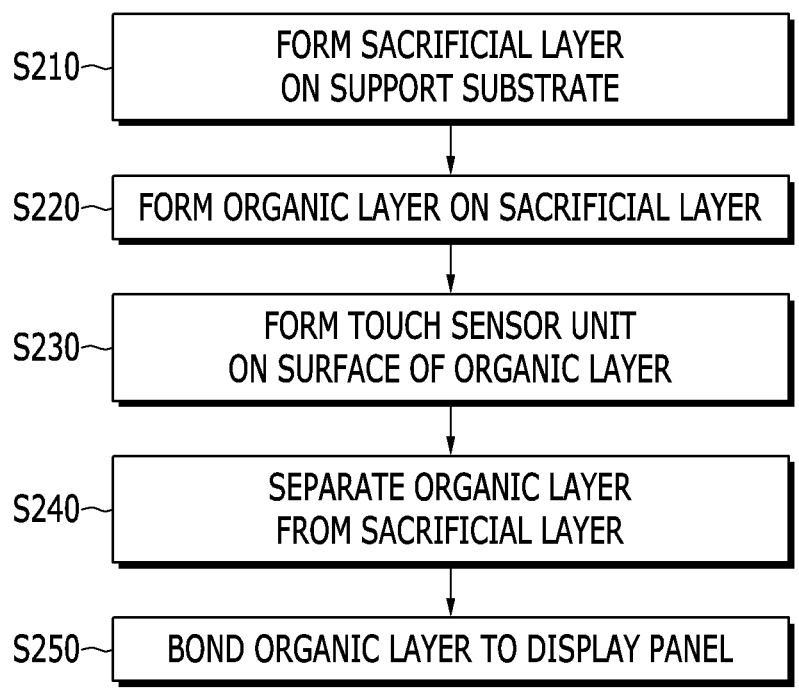
FIG. 10 is a flow chart illustrating a method for manufacturing a display device according to an exemplary embodiment.

FIG. 10 is a flow chart illustrating a method for manufacturing a display device according to an exemplary embodiment. FIGS. 11, 12, 13, and 14 are cross-sectional views illustrating a method for manufacturing a display device according to an exemplary embodiment.

Figure 11:
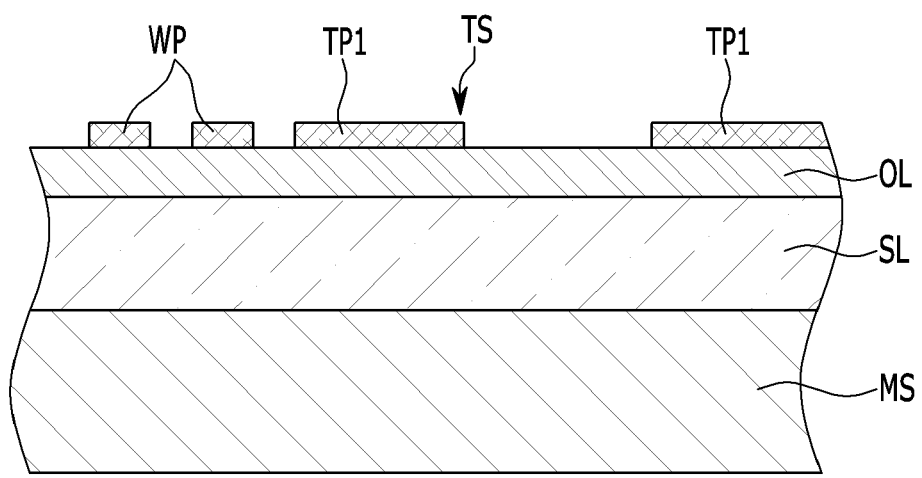
FIGS. 11, 12, 13, and 14 are cross-sectional views illustrating a method for manufacturing a display device according to an exemplary embodiment.

First, referring to FIG. 10 and FIG. 11, the sacrificial layer SL is disposed on the support substrate MS (S210). In detail, the sacrificial layer SL is formed on the support substrate MS, the support substrate MS including at least one of glass, an inorganic material, an organic materials, and the like. Here, the sacrificial layer SL may include an adhesive such as a pressure sensitive adhesive (PSA) but the exemplary embodiments are not limited thereto, and therefore, the sacrificial layer may include materials which are sublimatable by heat from laser beam and the like, or materials which are soluble by a solvent.

Next, the organic layer OL is disposed on the sacrificial layer SL (S220). In detail, the thin film organic layer OL may be formed by applying, depositing, or attaching the organic material onto the sacrificial layer SL. The organic layer OL is formed on the sacrificial layer SL accordingly may have a thickness of 1 μm to 20 μm.

Next, the touch sensor unit TS is formed on the organic layer OL (S230). In detail, the transparent conductive layer made of at least one of the transparent conductive oxides such as silver nano wire (AgNW), metal mesh, and indium tin oxide (ITO), the transparent conductive materials such as carbon nanotube (CNT) and graphene, the conductive polymers such as PEDOT:PSS, and the like is formed on the organic layer OL, and the transparent conductive layer is patterned using the MEMS technology, such as a photolithography process, to form the touch sensor unit TS on the organic layer OL. In this case, the wiring part WP may be formed with the touch sensor unit TS.

Figure 12:
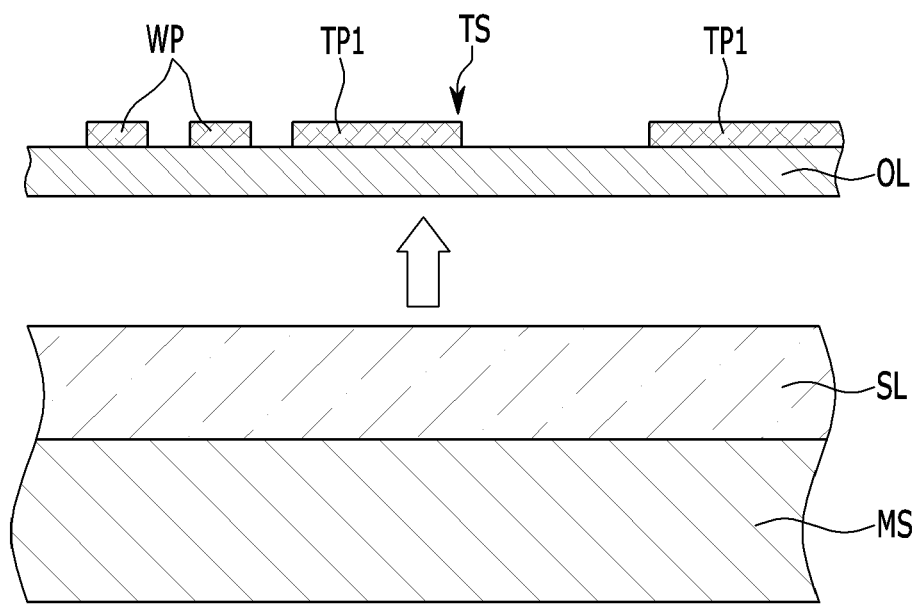

Next, referring to FIG. 12, the organic layer OL including the touch sensor unit TS is separated from the sacrificial layer SL (S240). In detail, the sacrificial layer SL including the adhesive is cooled to a temperature of 10° C. or less to deteriorate the adhesion of the sacrificial layer SL, thereby separating the organic layer OL including the touch sensor unit TS from the sacrificial layer SL. As a result, the organic layer OL including the touch sensor unit TS is separated from the support substrate MS.

When the sacrificial layer SL includes the materials which are sublimatable by heat from laser beam, the laser beam may be radiated to the sacrificial layer SL through the support substrate MS to sublimate the sacrificial layer SL, thereby separating the organic layer OL from the sacrificial layer SL.

Further, when the sacrificial layer SL includes the materials soluble by a solvent, the sacrificial layer SL may be dissolved by the solvent to separate the organic layer OL from the sacrificial layer SL.

Accordingly, the method for manufacturing a display device according to an exemplary embodiment uses the sacrificial layer SL to separate the organic layer OL including the touch sensor unit TS from the support substrate MS, such that the touch sensor unit TS formed on the organic layer OL may suffer decreased damaged from static electricity (ESD).

Figure 13:
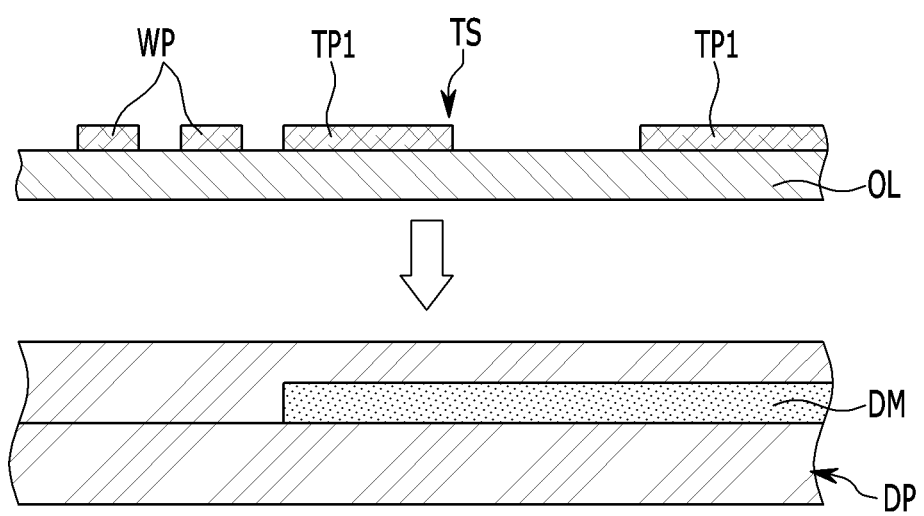
Figure 14:
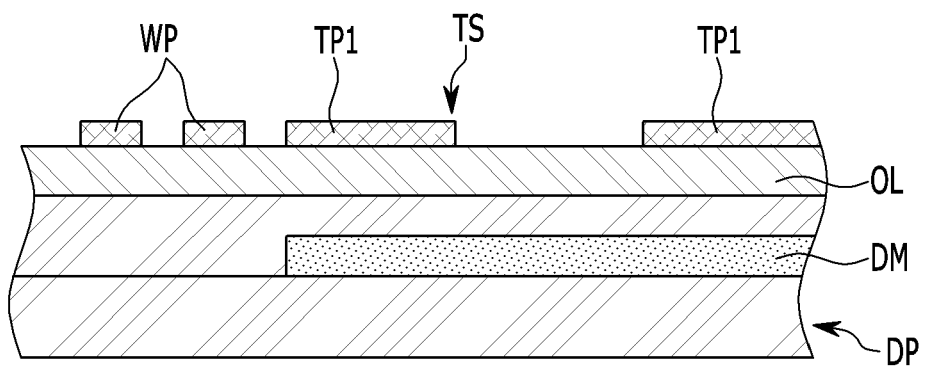

Next, referring to FIG. 13 and FIG. 14, the organic layer OL including the touch sensor unit TS is bonded to the display panel DP (S250). In detail, the organic layer OL including the touch sensor unit TS is disposed on the display panel DP and an interface between the organic layer OL and the display panel DP is heated using laser beam and the like to directly bond the organic layer OL to the display panel DP. As a result, the display device including the display panel DP, the organic layer OL, and the touch sensor unit TS is formed.

As such, the method for manufacturing a display device according to an exemplary embodiment includes: forming the organic layer OL, including the touch sensor unit TS disposed thereon, on the support substrate MS; separating the organic layer OL from the support substrate MS; and directly bonding the organic layer OL onto the display panel DP. Therefore, an effect to the display panel DP due to the process of respective forming the organic layer OL and the touch sensor unit TS may be reduced. That is, since the organic layer OL and the touch sensor unit TS may be formed regardless of the unique material characteristics of each of the components configuring the display panel DP and the position of the display panel DP, the material characteristics and the positions of each of the components configuring the display panel DP need not be considered in the process of manufacturing the display device 2000. For example, since there is no need to consider the material characteristics and the position of each of the components configuring the display panel DP, the organic layer OL formed with the touch sensor unit TS may be directly bonded to the display panel DP including an organic material, an inorganic material, glass, or metal like stainless steel, the display panel DP mounted in the car or the building, the very flexible display panel DP, and so on. That is, the exemplary embodiments provide a method for manufacturing a display device with improved manufacturing convenience and diversity.

As described above, the method for manufacturing a display device according to an exemplary embodiment uses the sacrificial layer SL to separate the organic layer OL including the touch sensor unit TS from the support substrate MS, such that the touch sensor unit TS formed on the organic layer OL may suffer decreased damage from static electricity (ESD). That is, the exemplary embodiment provides the method for manufacturing a display device with improved manufacturing reliability.

Further, the method for manufacturing a display device according to an exemplary embodiment forms the organic layer OL having the touch sensor unit TS formed on the surface thereof on the support substrate MS and separates the organic layer OL from the support substrate MS to directly bond the organic layer OL to the display panel DP, such that the display panel DP is not affected by the process of forming the organic layer OL and the touch sensor unit TS, respectively. That is, since the organic layer OL and the touch sensor unit TS are formed regardless of the unique material characteristics of the display panel DP and the position of the display panel DP, there is no need to consider the material characteristics and the positions of each of the components configuring the display panel DP in the process of manufacturing the display device 2000. For example, since there is no need to consider the material characteristics and the positions of the components configuring the display panel DP, the organic layer OL formed with the touch sensor unit TS may be directly bonded to the display panel DP including an organic material, an inorganic material, glass, or metal like stainless steel, the display panel DP mounted in the car or the building, the very flexible display panel DP, and so on. That is, the method for manufacturing a display device with improved manufacturing easiness and diversity is provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method for manufacturing a touch panel, comprising:
    disposing a sacrificial layer on a support substrate, the sacrificial layer comprising materials which are sublimatable by heat from a laser beam;
    disposing an organic layer on the sacrificial layer;
    disposing a touch sensor unit on the organic layer;
    separating the organic layer with the touch sensor unit from the sacrificial layer; and
    bonding the organic layer with the touch sensor unit onto a substrate,
    wherein the separating the organic layer comprises sublimating the sacrificial layer.

2. The method of claim 1, wherein bonding the organic layer to the substrate comprises heating the organic layer.

3. A method for manufacturing a display device, comprising:
    disposing a sacrificial layer on a support substrate, the sacrificial layer comprising materials which are soluble by a solvent;
    disposing an organic layer on the sacrificial layer;
    disposing a touch sensor unit on the organic layer;
    separating the organic layer with the touch sensor unit from the sacrificial layer; and
    bonding the organic layer with the touch sensor unit onto a display panel configured to display an image,
    wherein the separating the organic layer comprises dissolving the sacrificial layer.

4. The method of claim 3, wherein bonding the organic layer to the substrate comprises heating the organic layer.

* * * * *